Dec. 11, 1923.
J. T. BRYAN
1,477,239
DEVICE FOR BLOWING OUT OIL PIPES
Filed May 8, 1922
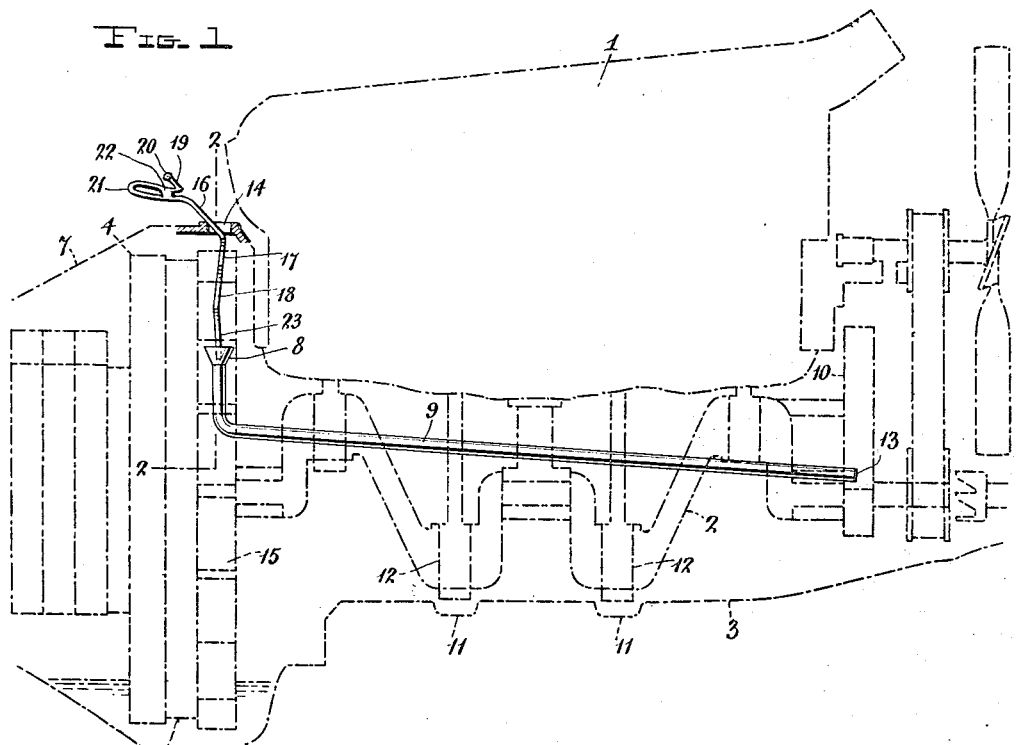
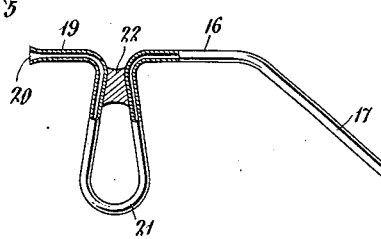
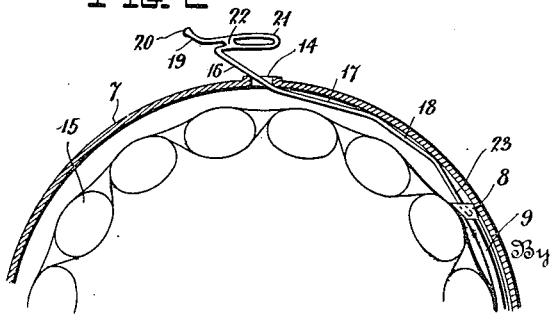
Inventor
Joseph T. Bryan,
By
Attorney Patented Dec. 11, 1923.

1,477,239

UNITED STATES PATENT OFFICE.

JOSEPH T. BRYAN, OF SEAFORD, DELAWARE, ASSIGNOR OF ONE-HALF TO LEVIN W. CULVER, OF SEAFORD, DELAWARE.

DEVICE FOR BLOWING OUT OIL PIPES.

Application filed May 8, 1922. Serial No. 559,346.

*To all whom it may concern:*

Be it known that I, JOSEPH T. BRYAN, a citizen of the United States, residing at Seaford, in the county of Sussex and State of Delaware, have invented new and useful Improvements in Devices for Blowing Out Oil Pipes, of which the following is a specification.

This invention relates to internal combustion engines and has for its object the provision of novel means for applying air under pressure to a conduit of a lubrication system for the purpose of removing obstructions therefrom.

More specifically, the object of the invention is to provide a nozzle of characteristic shape to enable it to be introduced into an aperture in the transmission case cover of a well known type of internal combustion engine power plant, and to be caused to traverse the annular space between the transmission case cover and the mechanism housed therein until its forward end enters the funnel shaped end of an oil conduit therein located, the outer end of said nozzle being adapted for attachment to a source of air supply such as a tire pump and having a handle for the manipulation of said device.

The further objects thereof will be hereinafter more fully set forth in the description of the invention which consists in the new and novel features of construction and combinations of parts hereinafter set forth and claimed.

In the accompanying drawings:—

Figure 1 is a side elevation of an automobile power plant showing the oil conduit with the improved air pressure applying means shown in operative relation thereto.

Figure 2 is a section taken along the line 2—2 of Figure 1 showing the air nozzle in place.

Figures 3 and 4 are respectively side and top elevations of my improved nozzle.

Referring now in detail to the several figures the numeral 1 represents a well known type of automobile power plant which finds its specific embodiment in the Ford automobile, comprising the usual crank shaft 2 and crank case 3, the latter being extended beneath the flywheel 4 to form an oil sump 5 in which is maintained a body of lubricating oil. In the type of power plant under consideration the lubrication is accomplished by the splash system, in which the oil is drawn up from the sump 5 upon the surface of the flywheel and the magnets 6 attached thereto, and is thrown with some violence against the walls of the crank case and transmission case cover 7 by centrifugal force. Some of said oil is caught in the funnel-shaped end 8 of the oil conduit 9 and flows by gravity through said conduit to the forward end of said power plant where it is discharged upon the timing gears 10, and then flows down into the crank case 3 returning to the sump 5. Incidentally it may be stated that on its way to the sump 5 it fills the depressions 11 in the crank case from which depressions it is splashed upwardly by the connecting rods 12 thereby furnishing lubrication to the connecting rod bearings and the reciprocating parts of the engine.

Stoppage of the oil pipe 9 is of occasional occurrence due to solid materials being thrown up with the oil by the flywheel, finding lodgement within the funnel 8 and conduit 9. Disastrous results are likely to follow such a stoppage due to discontinuation of the flow of oil through the crank case 3 and the consequent cessation of the functioning of the connecting rods as splashing elements in the scheme of lubrication. It is ordinarily extremely difficult to remove a stoppage from said oil conduit. Such an undertaking necessitates the removal of the radiator and other parts not shown from the forward end of the engine and the insertion of a probe at the end 13 of said conduit.

The present invention provides means whereby said oil conduit may be rendered accessible for the purpose of removing obstructive material therefrom without the performance of any mechanical operation upon the automobile power plant excepting the removal of a small plug known as the "magneto contact" which normally closes the aperture 14 in the top of the transmission case cover and projects thereinto into contact with the coil ring 15, which is shown both in Figure 1 and Figure 2. It will be understood that I make no claim to any feature of construction of the automobile power plant itself, the same being here set forth in some detail merely for the purpose of appropriately describing the shape and functioning of the device of my invention.

As will be observed, particularly from

Figure 2 the space between the oil ring 15 and the wall of the transmission case cover 7 is annular in form and so narrow that it would be impossible to introduce an unbent member into the aperture 14 and have it reach the funnel shaped end 8 of the conduit 9.

My invention contemplates the construction of a pipe or nozzle so shaped as to be able to enter said aperture and to traverse said annular passage, the inner end thereof being adapted to enter the funnel shaped end 8 when the device is fully introduced into said annular channel, for the purpose of applying pneumatic pressure to the interior of the oil conduit 9.

As will be observed, particularly from Figures 3 and 4 this pipe or nozzle includes essentially three straight portions 16, 17 and 18 arranged in series and angularly disposed. The straight portions 16 and 17 make with each other an angle of substantially 45° which angle lies in a plane perpendicular to the angle formed by the straight portions 17 and 18. As will be observed from Figure 4 this angle is slightly wider than the angle formed between the first two straight portions. Forwardly of the straight portion 16 the pipe or nozzle is bent into a U-shaped loop in the same plane as said straight portions 16 and 17 the forward end 19 of said nozzle which emerges from said loop being flared as at 20 for attachment to a conventional form of nipple by which said nozzle may be put into communication with a source of air under pressure such as the ordinary tire pump. The loop portion 21 serves as a handle for manipulating the nozzle and is preferably braced at its upper end by means of the web 22 which may be of solder or other material. The lower end 23 of the nozzle which adjoins the straight portion 18 is slightly bent so as to be properly disposed in the funnel 8 when the nozzle is in operative position, as shown in Figure 2.

My improved air pressure applying means is inserted into position in the following manner. It is first placed with the lower end 23 resting vertically in the aperture 14 against, or in proximity to the coil ring 15. It is then tilted in a transverse plane as far as possible, then it is rotated in a counter-clockwise direction as viewed in Figure 1 through an angle of substantially 90° which brings the portion 23 substantially tangential to the coil ring 15. The nozzle is then pushed inwardly until the bend between the portions 18 and 23 has entered said aperture then it is pushed toward the right, as viewed from Figure 1, in order to bring the straight portion 18 into the transverse plane of the coil ring. As soon as the bend between the straight portions 17 and 18 has entered the aperture 14 the nozzle is swung downwardly in a counter-clockwise direction and then pushed farther in, the straight portion 17 being then tangential to the coil ring 15. When the bend between the straight portions 16 and 17 is at the point of entering the aperture 14 the lower end of the nozzle is within the mouth of the funnel shaped end 8 and by slight manipulation of the handle 21 may be securely seated in the base of said funnel shaped portion. A tire pump is then coupled to the outer end 20 of the nozzle and pressure applied in a well known manner, forcing the obstructive matter through the oil conduit and effectually opening the latter. The nozzle is then withdrawn from the aperture 14 by reversing the operation by which it was inserted.

It will be understood that various changes may be made in the form and relation of parts to suit different requirements of use, and that the invention, therefore, is not limited to the precise details of construction and arrangement shown.

Having described my invention what I claim as new and desire to secure by Letters Patent, is:—

1. Means for blowing out the lubricating oil conduit of an internal combustion engine of the type having the transmission cover provided with an aperture in its upper wall, a narrow substantially annular passage between its inner surface and the mechanism housed within, said oil conduit having a funnel shaped end positioned within said annular passage, comprising a tubular element shaped to enter said aperture, traverse said annular passage and enter into said funnel shaped end, formed of a series of straight portions angularly arranged and adapted to be brought successively into substantial tangency with the peripheral surface of said housed mechanism.

2. Means for blowing out the lubricating oil conduit of an internal combustion engine of the type having the transmission cover provided with an aperture in its upper wall, a narrow substantially annular passage between its inner surface and the mechanism housed within, said oil conduit having a funnel shaped end positioned within said annular passage, comprising a tubular element shaped to enter said aperture, traverse said annular passage and enter into said funnel shaped end, formed of a series of straight portions angularly arranged and adapted to be brought successively into substantial tangency with the peripheral surface of said housed mechanism and a nozzle portion at the end of said series of straight portions.

3. Means for blowing out the lubricating oil conduit of an internal combustion engine of the type having a transmission cover provided with an aperture in its upper wall, a narrow substantially annular passage between its inner surface and the mechanism housed thereunder, said oil conduit having a funnel shaped end positioned within said annular passage, comprising a tubular element shaped to enter said aperture traverse said annular passage and enter said funnel shaped end, having at least three straight portions arranged in series and annularly disposed, the angle formed between the first and second of said straight portions lying in a plane substantially perpendicular to that in which lies the angle formed between the second and third portions.

4. Means for blowing out the lubricating oil conduit of an internal combustion engine of the type having the transmission cover provided with an aperture in its upper wall, a narrow substantially annular passage between its inner surface and the mechanism housed therein, said oil conduit having a funnel shaped end positioned within said annular passage, comprising a tubular element shaped to enter said aperture traverse said annular passage and enter said funnel shaped end, having at least three straight portions arranged in series and angularly disposed, the angle formed between the first and second of said straight portions lying in a plane substantially perpendicular to that in which lie the second and third portions, a U-shaped portion adjacent the first straight portion and lying in the same plane as said first portion and an air inlet communicating with said U-shaped portion.

5. Means for blowing out the lubricating oil conduit of an internal combustion engine of the type having the transmission cover provided with an aperture in its upper wall, a narrow substantially annular passage between its inner surface and the mechanism housed therein, said oil conduit having a funnel shaped end positioned within said annular passage, comprising a tubular element shaped to enter said aperture traverse said annular passage and enter said funnel shaped end, having at least three straight portions arranged in series and angularly disposed, the angle formed between the first and second of said straight portions lying in a plane substantially perpendicular to that in which lie the second and third portions, a portion comprising a U-shaped loop adjoining the first of said straight portions and provided with a web rigidly bridging the open end of said loop and an air inlet in communication with said U-shaped loop.

6. Means for blowing out the lubricating oil conduit of an internal combustion engine of the type having the transmission cover provided with an aperture in its upper wall, a narrow substantially annular passage between its inner surface and the mechanism housed therein, said oil conduit having a funnel shaped end positioned within said annular passage, comprising a tubular element shaped to enter said aperture traverse said annular passage and enter said funnel shaped end, having at least three straight portions arranged in series and angularly disposed, the angle formed between the first and second of said straight portions lying in a plane substantially perpendicular to that in which lie the second and third portions, a portion comprising a U-shaped loop adjoining the first of said straight portions and provided with a web rigidly bridging the open end of said loop, an air inlet in communication with said U-shaped loop and a bent outlet portion adjoining the third straight portion.

In testimony whereof I have hereunto set my hand in presence of two subscribing witnesses.

JOSEPH T. BRYAN.

Witnesses:
LEVIN W. CULVER,
JAMES K. PHILLIPS.